(12) United States Patent
Mochizuki et al.

(10) Patent No.: US 7,180,704 B2
(45) Date of Patent: *Feb. 20, 2007

(54) MAGNETIC HEAD FOR PERPENDICULAR RECORDING AND MAGNETIC DISK STORAGE APPARATUS MOUNTING THE HEAD

(75) Inventors: Masafumi Mochizuki, Kokubunji (JP); Atsushi Nakamura, Kodaira (JP); Yoji Maruyama, Iruma (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/134,350

(22) Filed: May 23, 2005

(65) Prior Publication Data

US 2005/0213244 A1    Sep. 29, 2005

Related U.S. Application Data

(60) Division of application No. 10/766,862, filed on Jan. 30, 2004, now abandoned, which is a continuation of application No. 10/366,360, filed on Feb. 14, 2003, now Pat. No. 6,710,972.

(30) Foreign Application Priority Data

Nov. 15, 2002   (JP)   ............................. 2002-331534

(51) Int. Cl.
*G11B 5/17* (2006.01)
(52) U.S. Cl. ........................ 360/123; 360/125
(58) Field of Classification Search ...................... None
See application file for complete search history.

(56) References Cited

U.S. PATENT DOCUMENTS 3,975,772 A   8/1976   Lin
4,413,297 A * 11/1983  Tanaka et al. .............. 360/119
4,535,369 A *  8/1985  Sawazaki ..................... 360/55
4,652,956 A   3/1987   Schewe (Continued)

FOREIGN PATENT DOCUMENTS

JP    4-252411    9/1992

(Continued)

OTHER PUBLICATIONS

IEEE Transactions on Magnetics, vol. 38, No. 1, Jan. 2002, "A New Single-Pole Head Structure for High Writability", K. Yamakawa et al, pp. 163-168, complete dates not found.

*Primary Examiner*—R. S. Tupper
(74) *Attorney, Agent, or Firm*—Mattingly, Stanger, Malur & Brundidge, P.C.

(57) ABSTRACT

A magnetic head is composed to diminish disordered writing bits of a recording layer or reading noise caused by a magnetic field generated from an under layer without decreasing a writing magnetic field strength of the magnetic head. The magnetic head includes a write head provided with a main pole and one or more auxiliary poles, a read head provided with a read element, and coils located on both sides of the main pole in a manner to sandwich the main pole. The coil located on one side generates the asymmetrical magneto-motive force for magnetizing the main pole to that generated by the coil located on the other side.

7 Claims, 12 Drawing Sheets

U.S. PATENT DOCUMENTS

| | | | |
|---|---|---|---|
| 4,652,957 A | 3/1987 | Schewe et al. | |
| 4,672,493 A * | 6/1987 | Schewe | 360/125 |
| 4,677,515 A | 6/1987 | Schewe | |
| 4,725,909 A * | 2/1988 | Kawai | 360/126 |
| 4,748,525 A | 5/1988 | Perlov | |
| 4,771,350 A | 9/1988 | Desserre | |
| 4,816,947 A | 3/1989 | Vinal et al. | |
| 4,825,318 A | 4/1989 | Hoo et al. | |
| 4,853,815 A | 8/1989 | Diepers | |
| 4,873,599 A | 10/1989 | Sueoka | |
| 5,014,148 A * | 5/1991 | Numazawa et al. | 360/125 |
| 5,027,246 A | 6/1991 | Numazawa et al. | |
| 5,073,836 A | 12/1991 | Gill et al. | |
| 5,142,426 A | 8/1992 | Re et al. | |
| 5,926,349 A | 7/1999 | Krounbi et al. | |
| 5,991,119 A | 11/1999 | Boutaghou et al. | |
| 6,169,642 B1 | 1/2001 | Mino et al. | |
| 6,181,514 B1 | 1/2001 | Santini et al. | |
| 6,224,719 B1 | 5/2001 | Westwood | |
| 6,477,005 B1 | 11/2002 | Sasaki | |
| 6,483,664 B2 | 11/2002 | Kamijima | |
| 6,507,464 B1 | 1/2003 | Ohashi et al. | |
| 6,513,228 B1 | 2/2003 | Khizroev et al. | |
| 6,618,227 B2 | 9/2003 | Yano et al. | |
| 6,636,390 B2 | 10/2003 | Funayama et al. | |
| 6,639,754 B2 | 10/2003 | Taguchi et al. | |
| 6,657,813 B2 * | 12/2003 | Nishida et al. | 360/125 |
| 6,728,065 B2 * | 4/2004 | Batra et al. | 360/126 |
| 6,754,049 B1 | 6/2004 | Seagle et al. | |
| 6,798,615 B1 * | 9/2004 | Litvinov et al. | 360/125 |

FOREIGN PATENT DOCUMENTS

| | | |
|---|---|---|
| JP | 2001-250204 | 9/2001 |
| JP | 2002-532814 | 10/2002 |
| WO | WO0034945 | 6/2000 |

* cited by examiner

{ CONVENTIONAL STRUCTURE HEAD }

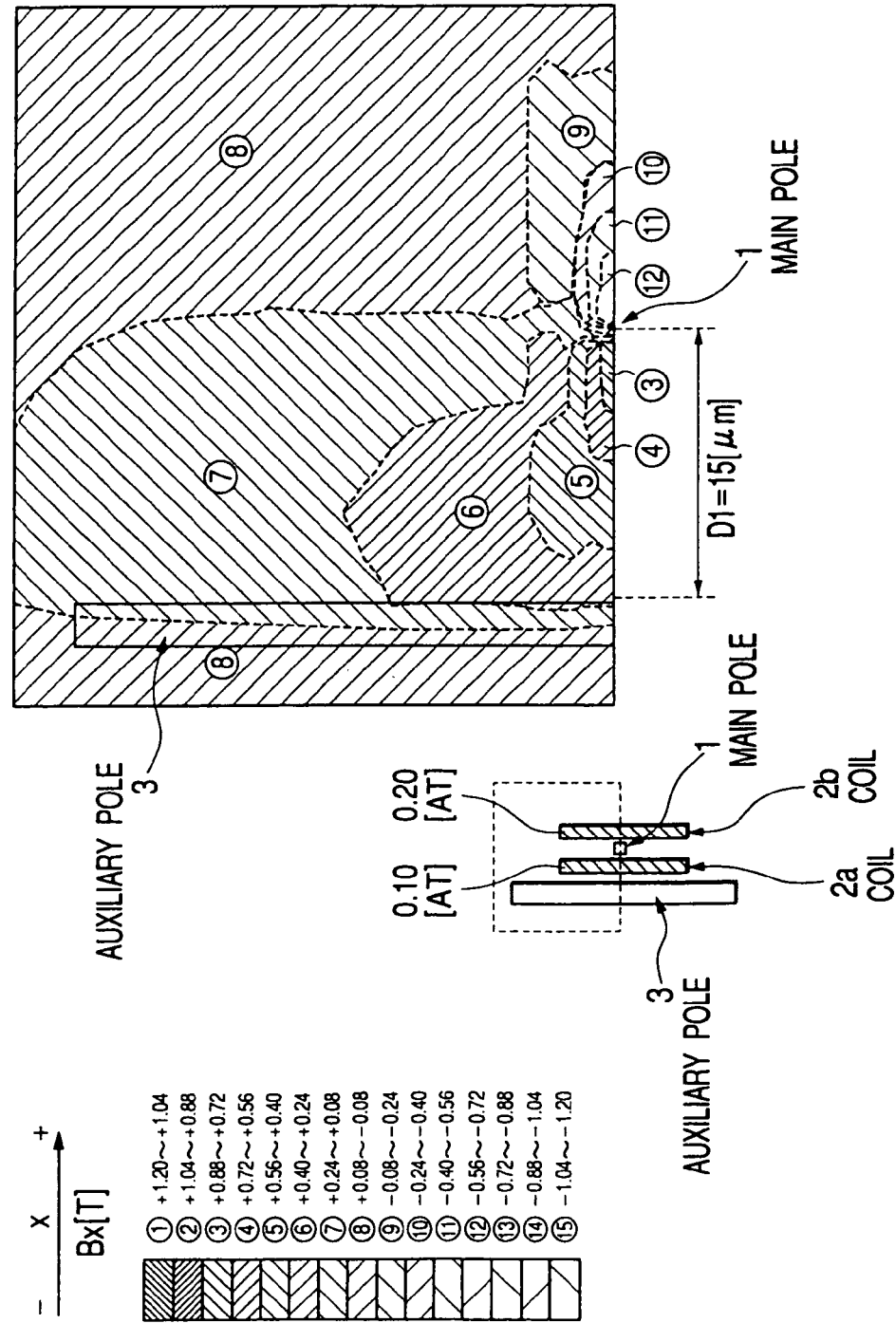
FIG. 6B THE INVENTION HEAD

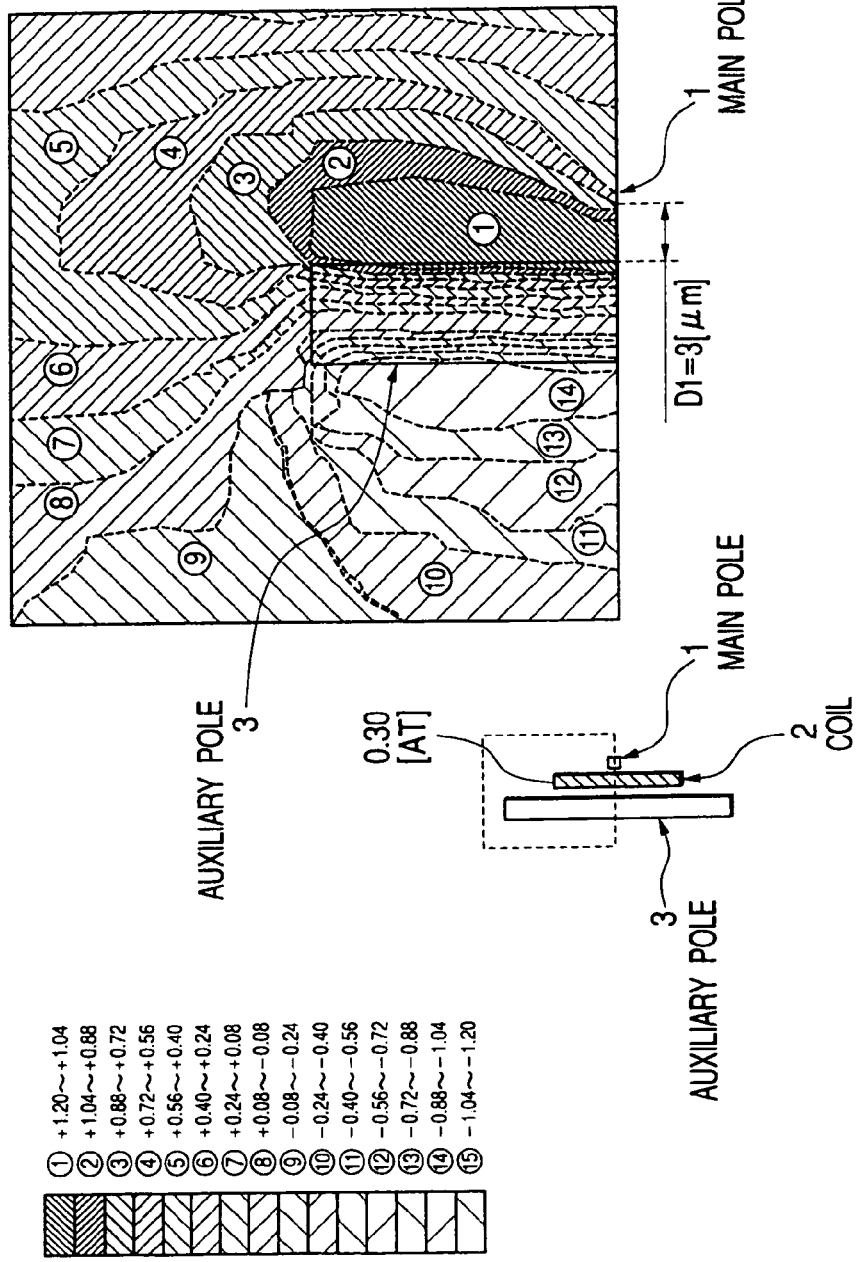
FIG. 7A CONVENTIONAL STRUCTURE HEAD

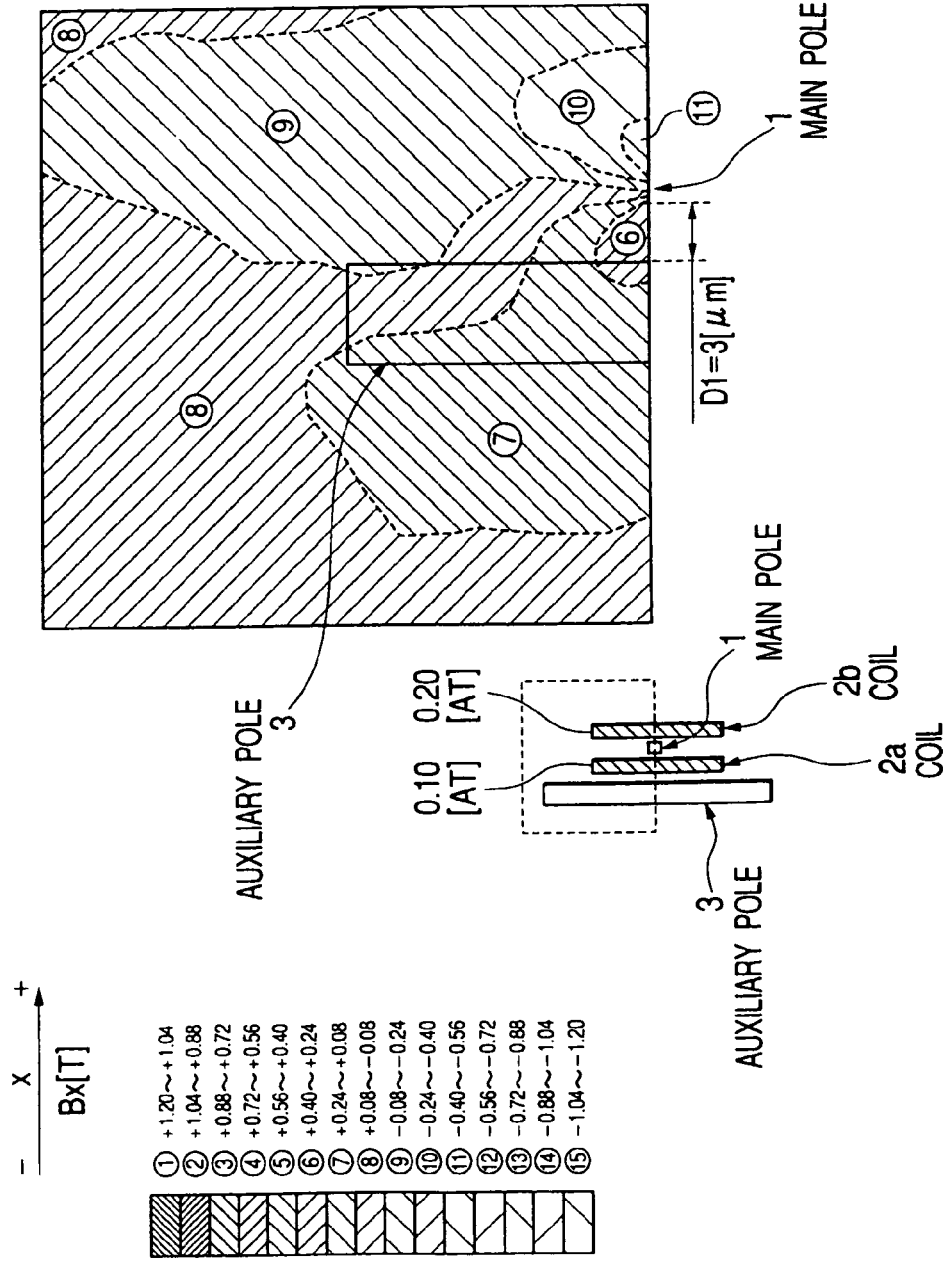
FIG. 7B THE INVENTION HEAD

MAGNETIC HEAD FOR PERPENDICULAR RECORDING AND MAGNETIC DISK STORAGE APPARATUS MOUNTING THE HEAD

This is a divisional application of U.S. Ser. No. 10/766,862, now abandoned filed Jan. 30, 2004, which is a continuation of Ser. No. 10/366,360, filed Feb. 14, 2003, now U.S. Pat. No. 6,710,972.

BACKGROUND OF THE INVENTION

1. Field of the Invention

The present invention relates to a magnetic head for perpendicular recording and a magnetic disk storage apparatus provided with the head mounted thereon.

2. Description of the Related Art

In general, the magnetic disk storage apparatus is composed so that data may be read or written on a recording medium by using a magnetic head. In order to increase a recording density per a unit area of a magnetic disk, it is necessary to decrease a size of recording bit. In the longitudinal magnetic recording system, however, a smaller recording bit disadvantageously causes a recording written magnetization on a medium to be lost by thermal fluctuation. This disadvantage brings about difficulty in enhancing the recording density. As the effective technique in overcoming this difficulty, the perpendicular recording system may be referred which is composed to record (or write) the magnetization in the perpendicular direction to the medium.

The perpendicular recording system may be roughly divided into one system composed to have a double layered perpendicular medium consisting of a recording layer served as a recording medium and a soft under layer and the other system composed to have a single layered perpendicular medium having no under layer. The system composed to use the double layered perpendicular medium as a recording medium needs the so-called single pole type head provided with a main pole and an auxiliary pole for writing data.

The provision of the soft under layer leads to increasing a writing magnetic field strength obtained by the write head but also leads disadvantageously to giving rise to a failure caused by the under layer itself. For example, magnetization on the under layer is changed according to the recorded bits on the recording layer and the write head field. This change brings about a magnetic field, which may disturb the writing bits written on the recording layer or be observed as noise when reading the magnetizing signal with a read element. Moreover, a certain kind of distribution of the change of magnetization may bring about a large magnetic field from the under layer.

A magnetic head having a plurality of auxiliary poles and coils has been known, an exemplary one of which is described in the following patent publication 1 and non-patent publication 1. The techniques disclosed in these publications are prepared for a stray field and do not make any allowance for the ratio of the magneto-motive force of a coil. Further, if the head is structured to have only one auxiliary pole, the coils are located symmetrically. This structure disables to suppress the noise caused by the change of magnetization of the under layer.

Patent Publication 1 . . . Official Gazette of Japanese Patent Laid-open No. 2001-250204

Non-patent Publication 1 . . . Pages 163 to 168 of IEEE Transactions on Magnetics. Vol. 38, No. 1, 2002

SUMMARY OF THE INVENTION

The magnetic field caused by the change of magnetization of the under layer, which may disadvantageously disturb the magnetization signal written on a recording layer or be observed as noise when reading the magnetization signal with the read element, leads to a great obstacle in realizing high-density recording.

It is therefore an object of the present invention to provide to reduce the noise caused by the change of magnetization of the under layer without decreasing the writing magnetic field strength of a write head.

The inventors of the present invention found out the following fact. As a result of analyzing the magnetic fluxes of the single pole type head and the under layer, it is possible to diminish the magnetic flux flowing through the under layer without greatly lowering the writing magnetic field strength as well as to suppress the disturbance of the recorded bits and the reading noise, both of which are brought about by the under layer, if the coils are located on both sides of the mail pole asymmetrically, concretely, the product of a number of windings and a current applied to the coil located on one side of the main pole is different from that of the coil located on the other side thereof.

According to an aspect of the invention, the magnetic head includes a write head having a main pole and one or more auxiliary poles and a read head having a read element and looped thin-film conductor coils located on both sides of the main pole in a manner to sandwich the main pole, the magneto-motive force (product of the number of windings and an applied current) of one coil being different from that of the other coil.

The use of the single pole type head having the coils structured to cause the magneto-motive forces asymmetrically makes it possible to provide the magnetic head for perpendicular recording that brings about no disturbance of the recorded bits and no reading noise resulting from the under layer. The mount of this type of single pole type head may provide a magnetic disk storage apparatus having a more improved recording density than the conventional apparatus.

Other objects, features and advantages of the invention will become apparent from the following description of the embodiments of the invention taken in conjunction with the accompanying drawings.

BRIEF DESCRIPTION OF THE DRAWINGS

FIGS. 6A, 6B are views illustrating reduction of a magnetic flux density of the under layer included in the first embodiment of the present invention;

FIGS. 7A, 7B are views illustrating reduction of a magnetic flux density of the under layer included in the second embodiment of the present invention;

DESCRIPTION OF EMBODIMENTS

Hereafter, the present invention will be described with reference to the appended drawings.

Figure 3:
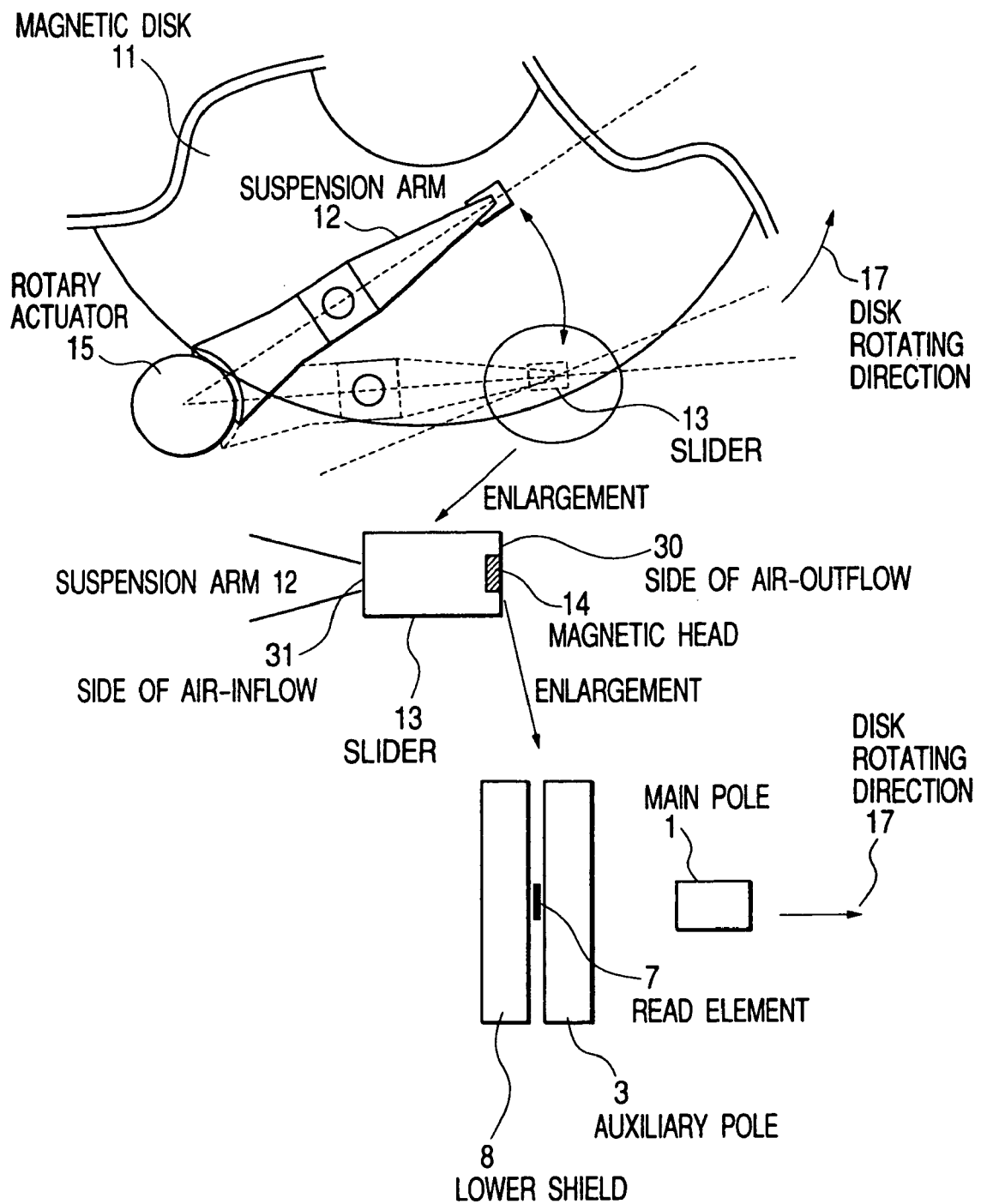
FIG. 3 is a conceptual schematic view showing a magnetic disk storage apparatus, for better understanding of the present invention.

At first, for better understanding of the invention, the schematic composition of a magnetic disk storage apparatus will be described. FIG. 3 is a schematic view showing the magnetic disk storage apparatus (in which view the magnification factors are not unified). The magnetic disk storage apparatus is composed so that a magnetic head 14 is floated on a magnetic disk 11 being in rotation when writing or reading the magnetization signal. The magnetic head 14 is mounted on a slider 13 fixed at the tip of a suspension arm 12 and is positioned by a rotary actuator 15.

Figure 4:
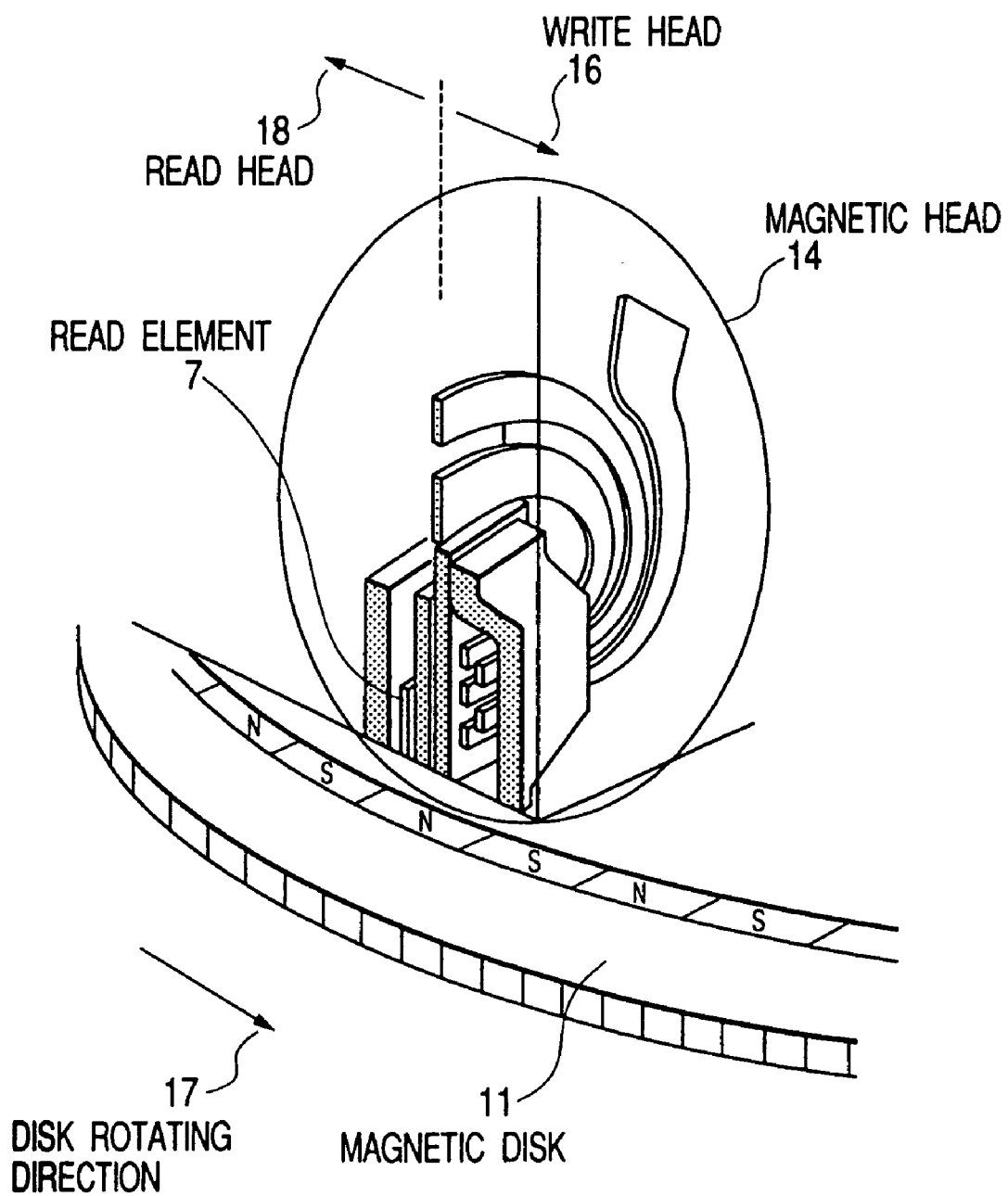
FIG. 4 is a schematic view showing relation between a magnetic head for perpendicular recording and a magnetic disk, for better understanding of the present invention.

FIG. 4 is a schematic view showing relation between a magnetic head for perpendicular recording 14 and the magnetic disk 11 (in which view the magnification factors are not unified, the head section is illustrated, and the main components are simplified). As is obvious from this figure, the magnetic head 14 is composed of a read head 18 and a write head 16. The read head 18 is composed of two shield films located vertically in a manner to sandwich a read element 8. The write head 14 is composed of a main pole, an auxiliary pole and a looped thin-film conductor coil located between these poles and served as magnetizing the main pole. The upper shield layer located on the side of the write head may be integrally formed with and served as the auxiliary pole of the write head.

Figure 5:
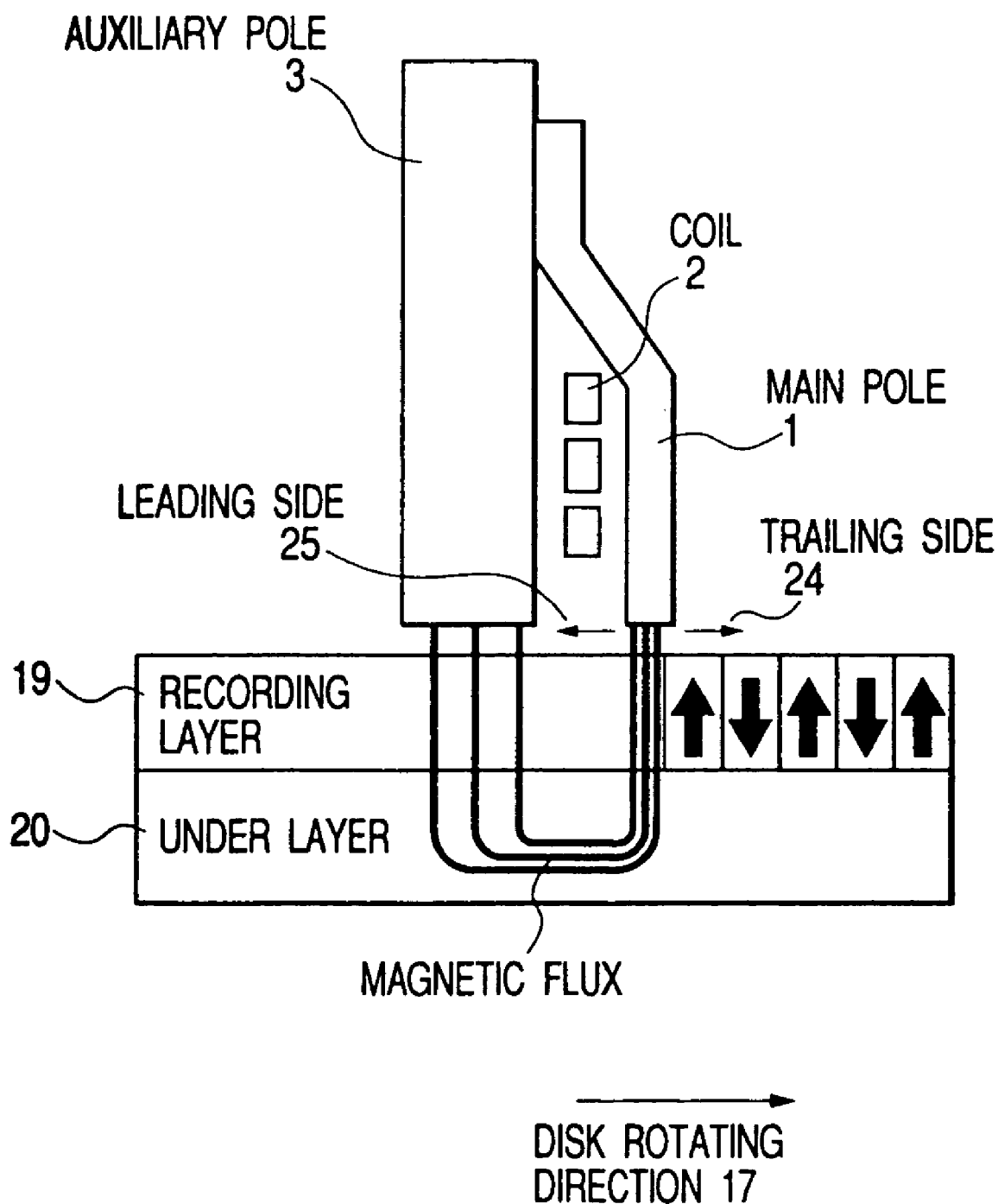
FIG. 5 is a schematic view useful of better understanding perpendicular recording.

FIG. 5 is a conceptual view showing perpendicular recording (in which view the head section is illustrated and the main components are simplified). A magnetic circuit is formed so that a magnetic field generated from the main pole 1 passes through an under layer 20 and enters the auxiliary pole 3. By applying target current to a coil 2, it is possible to apply a magnetic field in a predetermined direction from the main pole 1 onto a recording layer 19 and then record a target magnetization pattern on the recording layer 19. As a magnetic disk medium may be formed an intermediate layer between the recording layer 19 and the under layer 20. The read element 7 may be a giant magneto-resistance effect element (GMR) or a tunnel magnetic-resistance effect element (TMR). In FIG. 5, a numeral 17 denotes a rotating direction of the disk. The auxiliary pole 3 is located on the leading side 25 of the main pole 1.

First Embodiment

Figure 2:
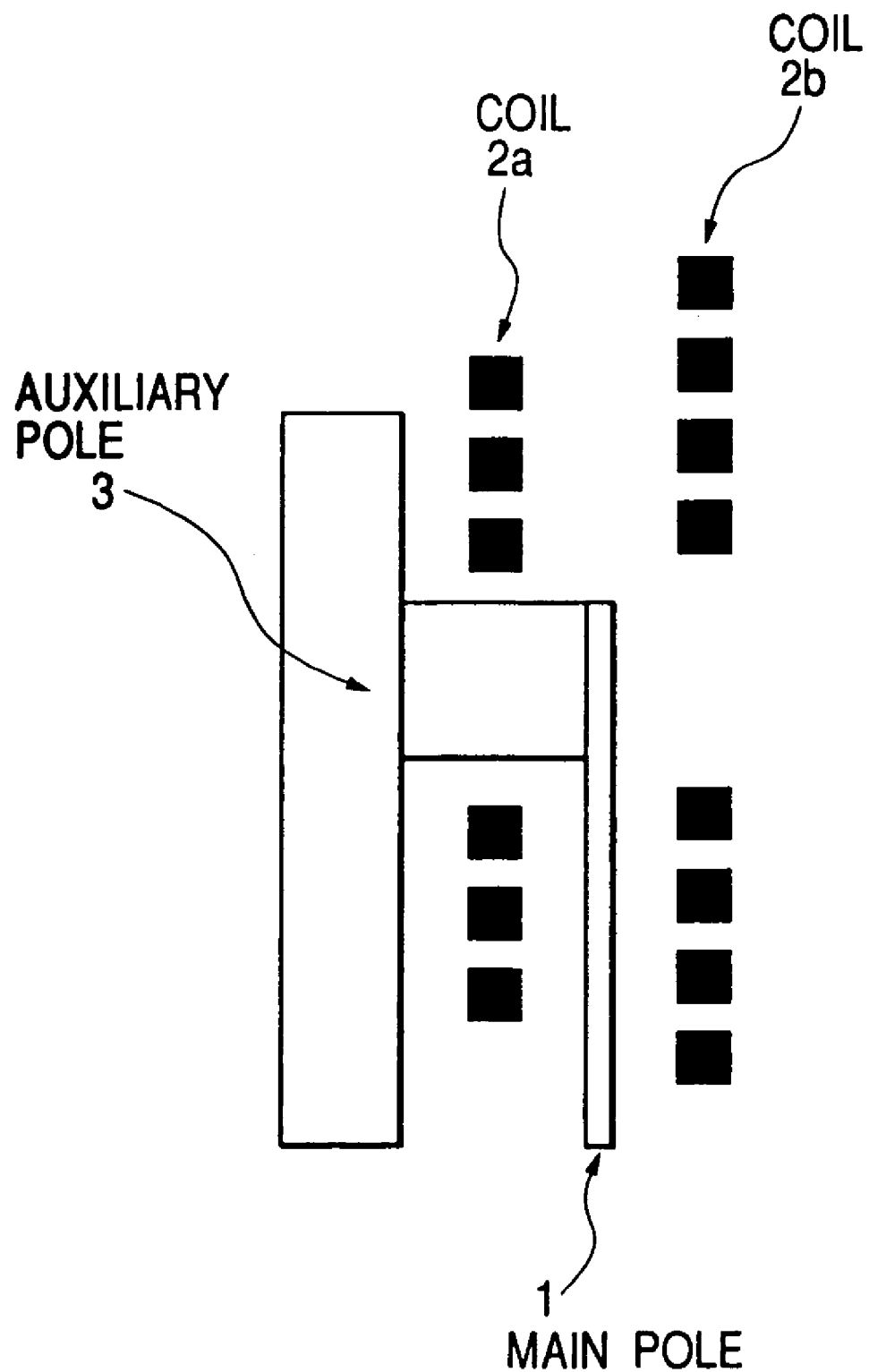
FIG. 2 is a sectional model view showing a structure of a single pole type head according to a first embodiment of the present invention.

FIG. 2 is a sectional model view showing the first embodiment of a single pole type write head used in the present invention. In this embodiment, the write head is composed of a main pole 1, an auxiliary pole 3 and thin-film conductor coils 2a and 2b located on both sides of the main pole 1 in a manner to sandwich the main pole 1. The schematic model view of FIG. 2 sectionally illustrates the magnetic head in the disk rotating direction from the center of the disk track, in which view the magnification factors are not unified. The two coils 2a and 2b may be composed so as to be connected in the disk rotating direction so that a magnetic field of the same polarity may be generated at the tip of the main pole 1. Or, these coils 2a and 2b may be composed to separate these coils 2a and 2b from each other so that each coil generates the magnetic field of the same polarity at the tip thereof.

As is obvious from FIG. 2, in this embodiment, the number of windings of the coil 2a located on the side where the auxiliary pole is not provided is more than that of the coil 2b located between the main pole and the auxiliary pole so that the magneto-motive force of the coil 2b is greater than that of the coil 2a. In addition, the auxiliary pole 3 may be formed integrally with and served as the upper shield of the read head.

Figure 6A:
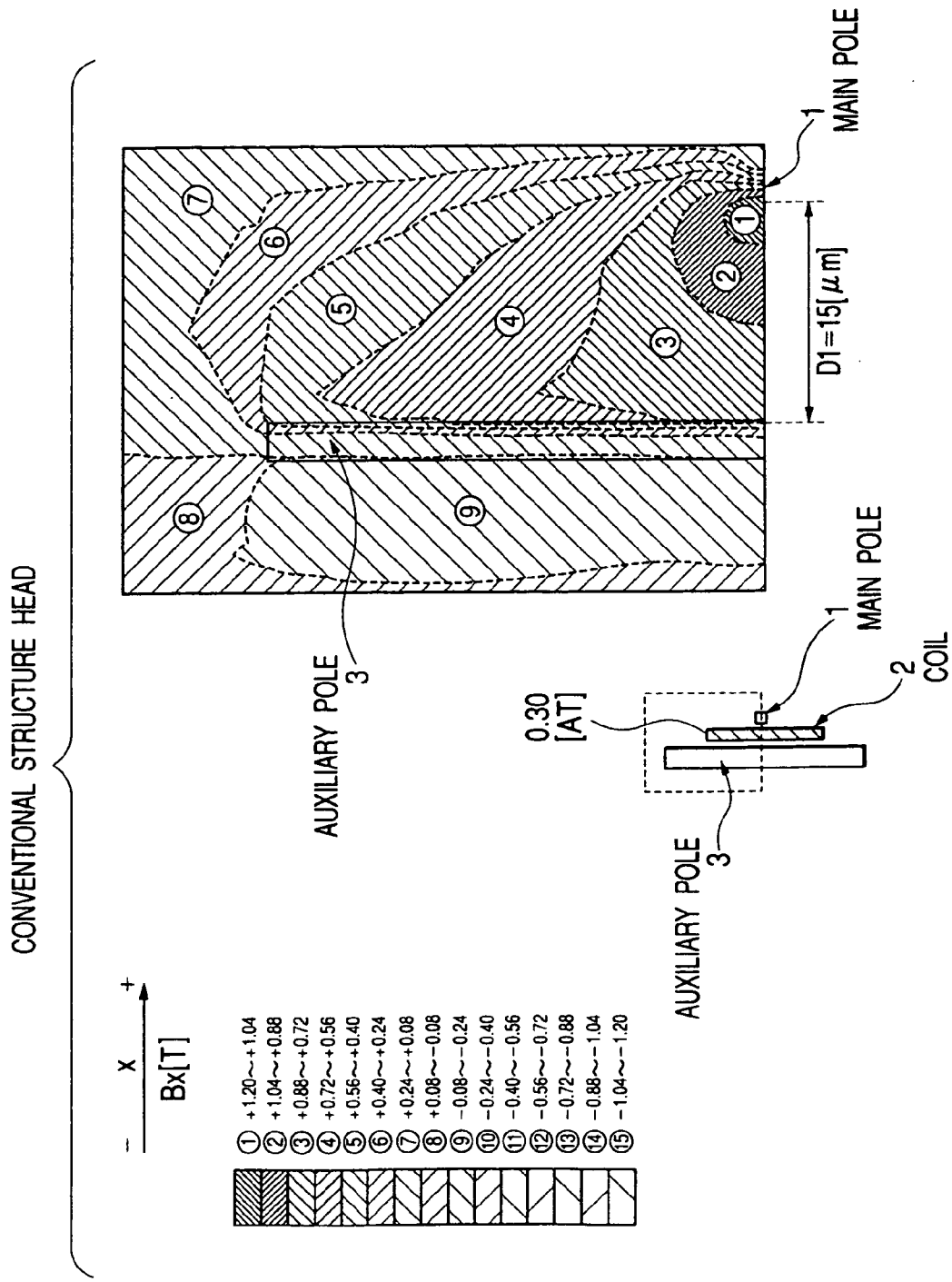

FIGS. 6A, 6B show the magnetic flux density distributions of the under layer in which the two coils have respective magneto-motive forces, for comparing the head of the conventional structure (FIG. 6A) with the single pole type head of the present invention (FIG. 6B). In FIGS. 6A and 6B, the tones specified by the scales indicate the corresponding magnetic flux densities, in which more dense portions correspond with higher magnetic flux densities. Further, in FIGS. 6A and 6B, the magnetic flux density distribution shown in the right hand concerns with only the portion enclosed by the dotted line of the schematic model view of the magnetic head as viewed from the floating surface shown in the left hand.

In the magnetic flux density distribution shown in FIG. 6A or 6B, the real line indicates an auxiliary pole 3, while the main pole 1 is represented by a dot because it is too small in the scale of these figures. Hence, the form of the main pole 1 cannot be visible. Herein, it is assumed that the under layer 20 is composed of a material having a saturation magnetic flux density of 1.2T. The head of the conventional structure (coil: 0.30AT) shown in FIG. 6A is composed so that the magnetic flux density of the under layer reaches 1.13T as a maximum value. On the other hand, in the head structure of the present invention, the magnetic flux density formed in the under layer reached 0.59T as a maximum value because the coils 2a and 2b located asymmetrically on both sides of the main pole 1 have the magneto-motive forces of 0.10AT and 0.20, respectively. In these cases, the conventional structure has a writing magnetic field strength of $9.0 \times 10^5$ [A/m], while the head structure of this embodiment has a strength of $8.5 \times 10^5$ [A/m]. That is, the reduction was less than 10%. It was revealed by the tones of FIG. 6B that the head structure of this embodiment has a smaller maximum value of the magnetic flux density as well as a smaller whole magnetic flux density of the under layer 20. This resulted in reducing the noise caused by the under layer 20.

In FIGS. 6A to 6B, the magnitude of the magnetic flux density is represented by variable tone and also is divided into the areas 1 to 15.

Figure 1:
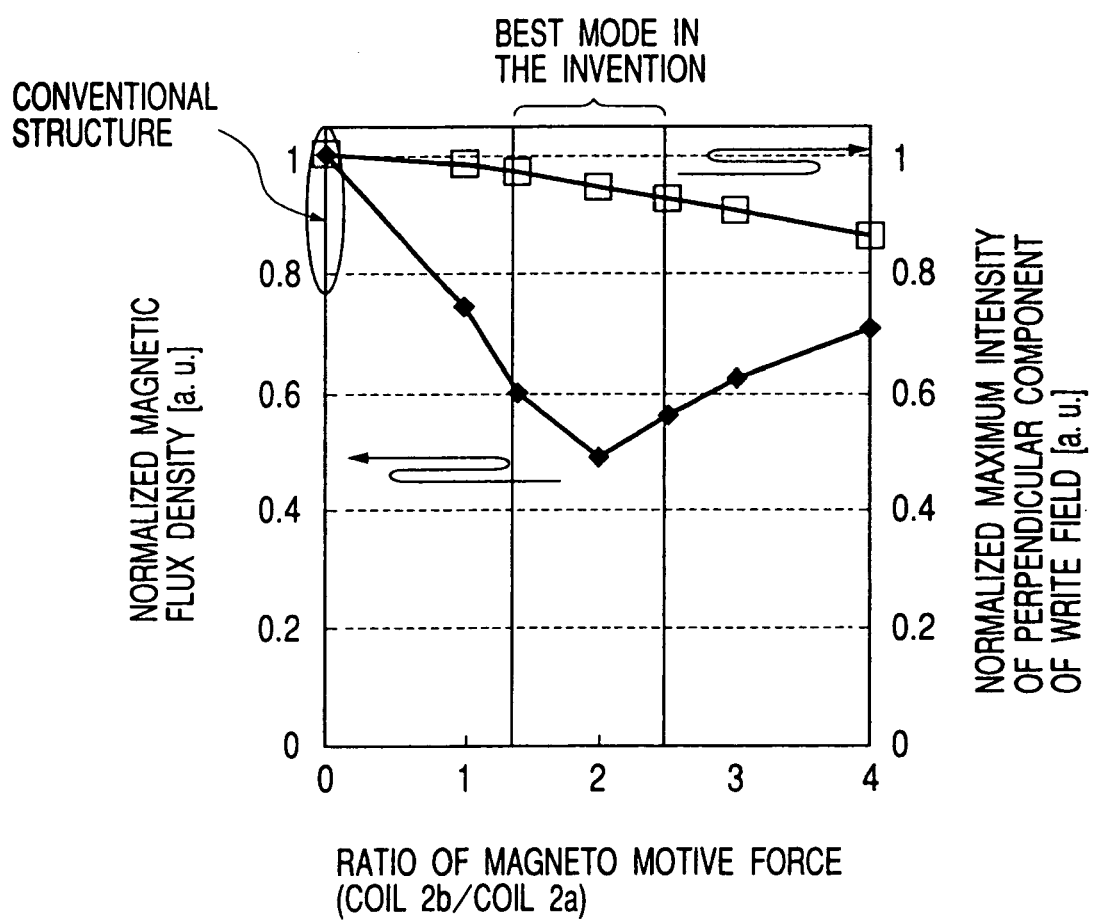
FIG. 1 is a graph useful of explaining the effect of a magnetic head according to the present invention, in which a magnetic flux density of an under layer is being diminished.

FIG. 1 is a graph that is useful of explaining the effect of the magnetic head of this embodiment. Concretely, the graph of FIG. 1 shows the changes of maximum value of the magnetic flux density of the under layer 20 and the write head field strength against the ratio of the magneto-motive forces of the two coils 2a and 2b located on both sides of the main pole 1. The axis of ordinate represents the normalized magnetic flux density of the conventional structure. As is obvious from FIG. 1, by changing the ratio of the magneto-motive forces of the two coils 2a and 2b, it is possible to reduce the magnetic flux density of the under layer 20. For example, by making the magneto-motive force of the coil 2b located on the side having no auxiliary pole 1.5 time larger than the coil 2a located between the main pole 2 and the auxiliary pole 3, it is possible to reduce the magnetic flux density of this embodiment into 60% of that of the conventional structure. Further, in this embodiment, it is preferable to keep the ratio of the magneto-motive forces of the two coils 2a and 2b (coil 2b/coil 2a) 2.5 or less. If the ratio of magneto-motive force (coil 2b/coil 2a) is 2.5 or less, the magnetic flux density of the under layer 20 may be reduced into 60% of the conventional structure as keeping the reduction of the writing magnetic field strength 10%.

Further, this embodiment is composed so that the coils 2a and 2b have respective number of windings, that is, are located asymmetrically on both sides of the main pole. In place, it may be composed so that the current values to be applied to the coils 2a and 2b may be changed as keeping the number of windings of each coil constant. This composition makes it possible to obtain the coil structure in which the coils generate their respective asymmetric magneto-motive forces. Moreover, by making the current values to be applied to the coils 2a and 2b and the numbers of windings of the coils different from each other, the coils may generate the asymmetric magneto-motive forces.

The auxiliary pole 3 may be located on the trailing side of the main pole 1 or the leading side thereof. The auxiliary pole may be provided on one side or both sides of the main pole so that both sides of the main pole may have respective densities of the magnetic fluxes flown from the main pole to the auxiliary pole.

Further, the coils may be located on both sides of the main pole in the track width direction.

Second Embodiment

FIGS. 7A, 7B show the magnetic head according to the second embodiment of the invention. The views of these figures show the magnetic flux density distribution in the case that the distance D1 between the main pole 1 and the auxiliary pole 3 (that is, the distance between the opposed side of the main pole 1 to the auxiliary pole 3 and the opposed side of the auxiliary pole 3 to the main pole) is changed into 3 μm, for comparing the head of the conventional structure (see FIG. 7A) with the single pole type head of the present invention (see FIG. 7B). In the conventional structure shown in FIG. 7A, by narrowing the distance D1 more than the distance D1 of 15 μm, the distribution of a greater magnetic flux density is made wider. On the other hand, in the head structure of the invention shown in FIG. 7B, even if the distance D1 between the main pole 1 and the auxiliary pole 3 is made narrower, the magnetic flux density of the under layer 20 is made smaller.

In FIGS. 7A and 7B, the magnitude of the magnetic flux density is represented by variable tones and also is divided into the areas 1 to 15.

Figure 8:
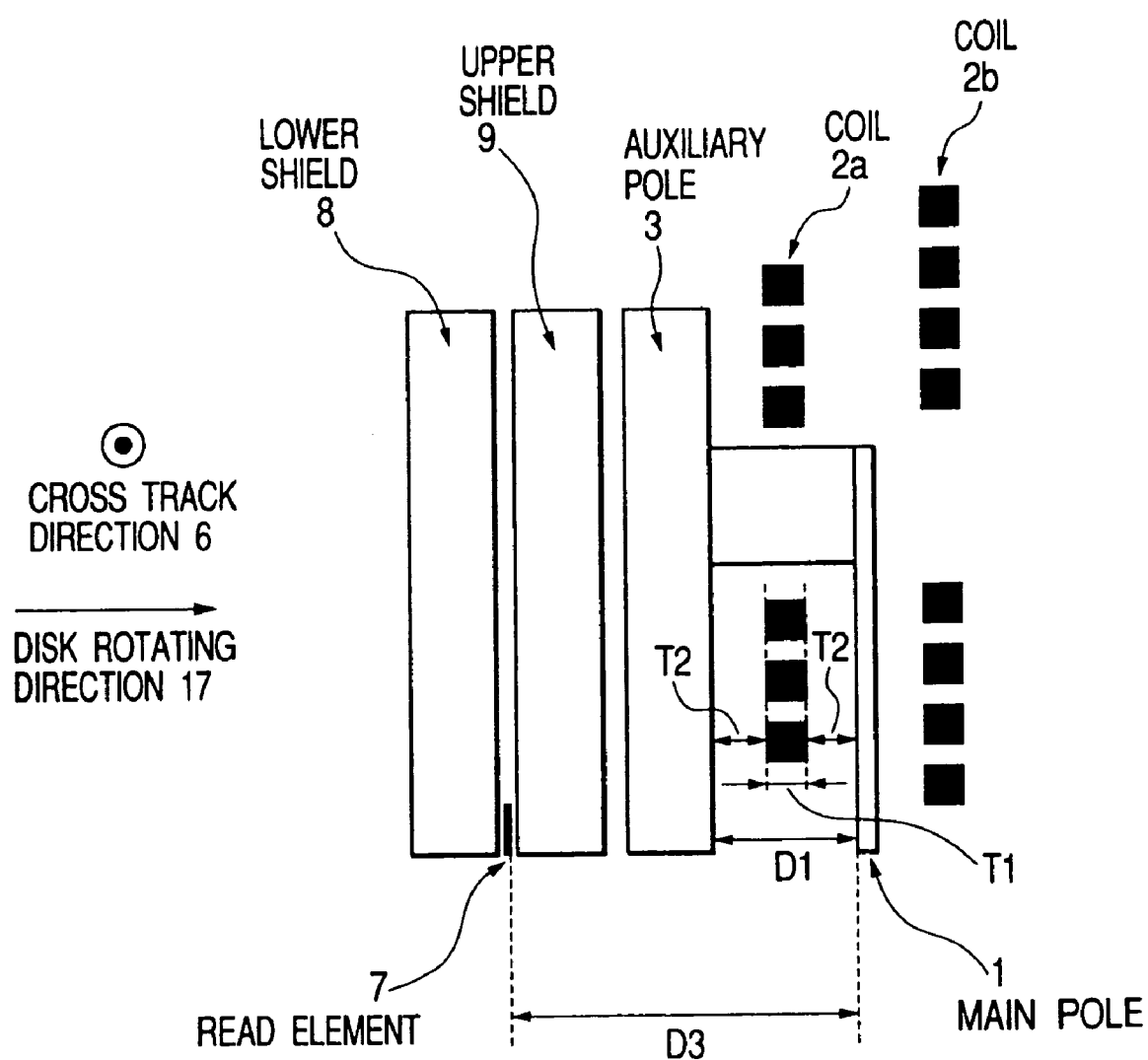
FIG. 8 is a model view showing the second embodiment of the present invention and a structure of a write and read composite head having a single pole type head according to the present invention.

Hence, as shown schematically in FIG. 8 (schematic section of the track center in the disk rotating direction), the head structure of the invention allows the distance D1 between the main pole and the auxiliary pole (between the opposed side of the main pole 1 to the auxiliary pole 3 and the opposed side of the auxiliary pole 3 to the main pole) to be narrowed to a film thickness T1 of the coil 2a and a film thickness T2 of an insulating layer (served as insulatively separating the coil 2a from the main pole 1 and the auxiliary pole 3) without having to increase the magnetic flux density of the under layer 20. That is, the distance between the main pole and the auxiliary pole may be made smaller to [number of coil layers×T1+(number of coil layers+1)×T2]. The thickness T2 of the insulating layer may be made smaller to 100 nm in consideration of its pressure resistance. This makes it possible to narrow a distance D3 between the read element 7 sandwiched between a lower shield 8 and an upper shield 9 to the opposed side of the main pole 1 to the read element. Thus, as shown in FIG. 8, this embodiment may offer a read and write composite head that is suitable to the high-density recording. In addition, in FIG. 8, the auxiliary pole 3 may be integrally formed with and served as the upper shield 9.

Third Embodiment

Figure 9:
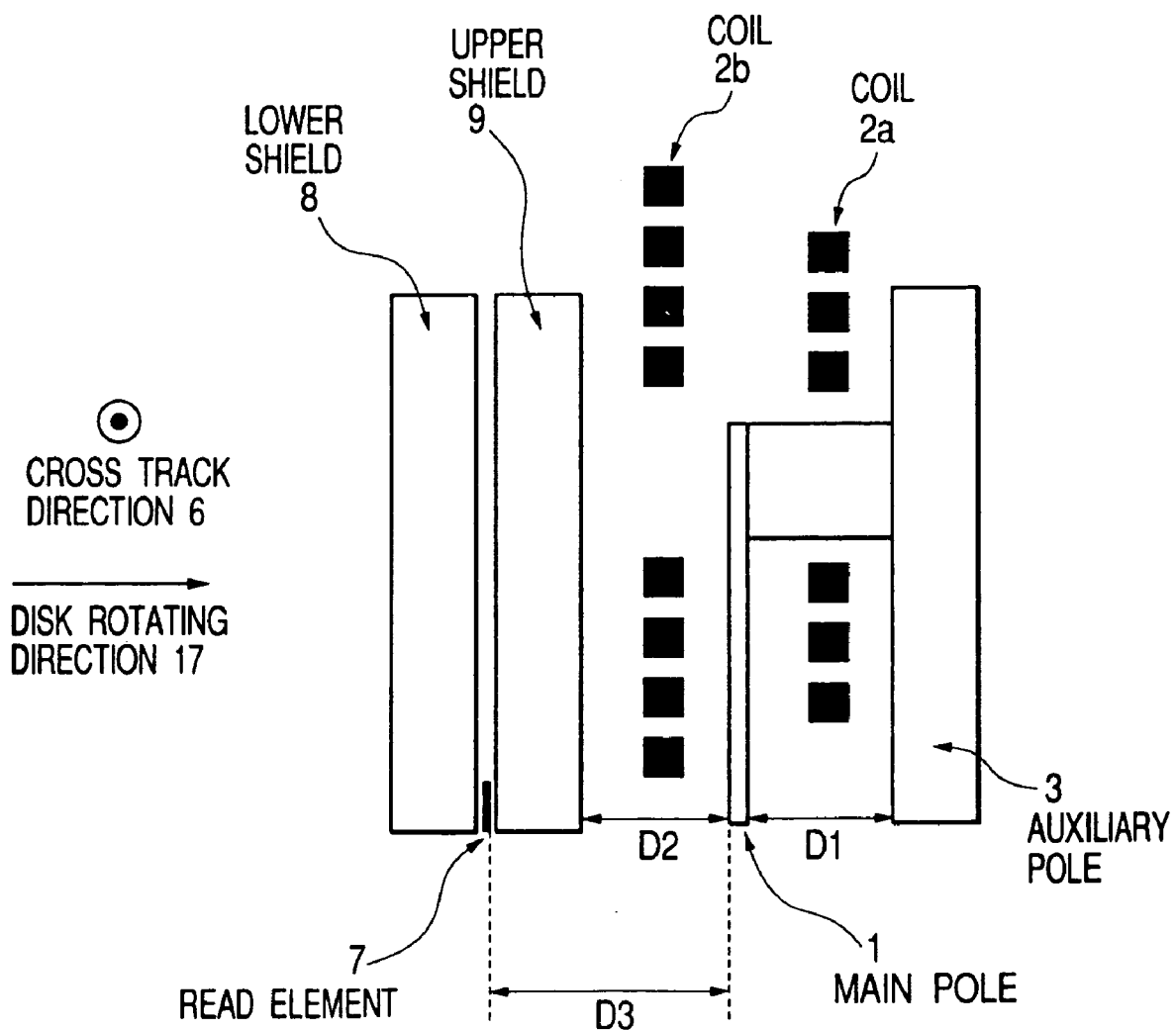
FIG. 9 is a model view showing a third embodiment of the present invention and a write and read composite head having a single pole type head according to the present invention.

FIG. 9 is a schematic sectional view showing a magnetic head according to a third embodiment of the present invention, in which view the read element 7 and the auxiliary pole 3 are located in a manner to sandwich the main pole 1 and the coils are located on both sides of the main pole in an asymmetrical manner, that is, in a manner to apply respective magneto-motive forces onto both sides of the main pole as described with respect to the foregoing first and second embodiments. The section is cut on the center of the track in the disk rotating direction.

In this embodiment, no auxiliary pole 3 is provided between the read element 7 and the main pole 1, so that the distance D3 between the read element 7 and the opposed side of the main pole 1 to the read element 7 may be made narrower by the film thickness. Moreover, since the magnetic flux being flown from the main pole 1 to the upper shield 9 is suppressed, it is preferable to make the distance D2 between the upper shield 9 and the main pole 1 (in particular, the distance between the opposed side of the upper shield 9 to the main pole and the opposed side of the main pole 1 to the upper shield) greater than the distance D1 between the opposed side of the main pole to the auxiliary pole and the opposed side of the auxiliary pole to the main pole.

Further, in order to suppress the magnetic flux being flown into the upper shield 9, in this embodiment, it is preferable to make a product ($\mu a/D1$) of an inverse of the distance D1 and a permeability $\mu a$ of the auxiliary pole 3 greater than a product ($\mu s/D2$) of an inverse of the distance D2 and a permeability $\mu s$ of the upper shield, the distance D1 meaning a spacing between the main pole and the auxiliary pole, concretely, the opposed side of the main pole 1 to the auxiliary pole and the opposed side of the auxiliary pole to the main pole and the distance D2 meaning a spacing between the main pole and the upper shield, concretely, between the opposed side of the upper shield film 9 to the main pole and the opposed side of the main pole 1 to the upper shield film.

In addition, in this embodiment, the trailing side may be reversed in position to the leading side.

Fourth Embodiment

Figure 10:
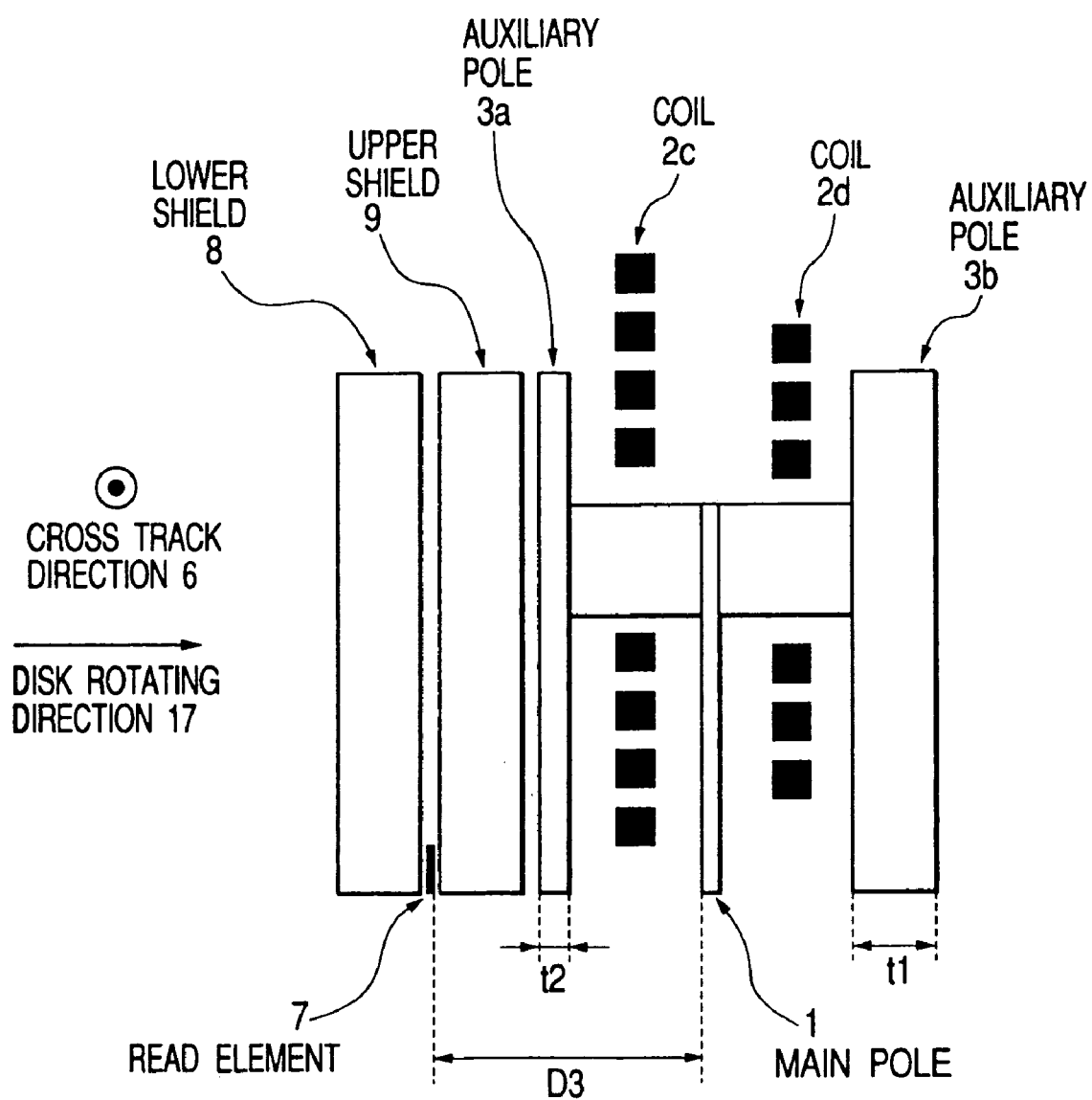
FIG. 10 is a model view showing a fourth embodiment of the present invention and a structure of a write and read composite head having a single pole type head according to the present invention.

FIG. 10 is a schematic sectional view showing a magnetic head according to a fourth embodiment of the present invention. The section is cut on the center of the track of the head in the disk rotating direction. In this embodiment, the auxiliary poles 3a and 3b are located on the trailing side and the leading side in a manner to sandwich the main pole 1. The coil 2c is located between the main pole 1 and the auxiliary pole 3a and the coil 2d is located between the main pole 1 and the auxiliary pole 3a. The opposed area of the auxiliary pole 3a to the floating surface is made greater than the opposed area of the auxiliary pole 3b to the floating surface and the magneto-motive force of the coil 2c, which corresponds to a product of the number of windings of each coil 2c located on the side of the auxiliary pole 3a with a smaller area and a current applied to the coil, is made greater than the magneto-motive force of the coil 2d located on the auxiliary pole 3b with a larger area. The resulting coils generate the asymmetrical magneto-motive forces.

In this embodiment, the magneto-motive force of the coil 2c located on the leading side is greater than, that is, asymmetrical to that of the coil 2d located on the trailing side. Hence, the film thickness t2 of the auxiliary pole 3a located on the leading side is made thinner than the film thickness t1 of the auxiliary pole 3b located on the trailing side. This allows the distance between the read element 7 and the main pole 1 (concretely, between the read element 7 and the opposed side of the main pole 1 to the read element) to be narrowed accordingly. The resulting composition offers the read and write composite magnetic head that is suitable to the high-density recording.

In addition, in this embodiment, the trailing side may be reversed in position to the leading side.

Fifth Embodiment

This embodiment concerns a magnetic disk storage apparatus which is suitable for high-density recording. The magnetic disk storage apparatus includes a magnetic head of the invention, the magnetic head having a main pole, at least one auxiliary pole, and coils each composed of a thin-film conductor coil that are located in a manner to sandwich the main pole and to make the magneto-motive force of the coil located on one side different from that of the coil located on the other side; a magnetic disk medium composed of a soft under layer and a recording layer laminated thereon; a magnetic circuit arranged to be opposed to the magnetic disk medium rotating on the magnetic head and cause the magnetic field coming from the main pole to enter into the auxiliary pole through the recording layer and the under layer, the magnetic field coming from the main pole being applied into the recording layer by passing current through the coils for writing a magnetizing signal.

As set forth above, the magnetic head for perpendicular recording uses the structure of the coils asymmetrically located on both sides of the main pole, which includes the write head having the main pole and one or more auxiliary poles, the read head provided with the read element, and coils each composed of a thin-film conductor being located on both side of the main pole, the magneto-motive force of the coil located on one side being different from that of the coil located on the other side. This coil structure makes it possible to reduce the magnetic flux density flowing through the under layer and thereby to diminish the noise generated by the under layer without deteriorating the writing magnetic field strength generated by the main pole.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A magnetic head comprising:
a reproducing head having an upper shield, a lower shield, and a reproducing element disposed between said upper shield and said lower shield;
a recording head having a main magnetic pole, a first auxiliary magnetic pole, a second auxiliary magnetic pole, and a first excitation coil and a second excitation coil disposed at both sides of said main magnetic pole, said first excitation coil is formed between said main magnetic pole and said first auxiliary magnetic pole, said second excitation coil is formed between said main magnetic pole and said second auxiliary magnetic pole;
wherein an area opposed to a floating surface side of said first auxiliary magnetic pole and an area opposed to a floating surface side of said second auxiliary magnetic pole are asymmetric, a number of turns of coil of said first excitation coil and a number of turns of coil of said second excitation coil are asymmetric, said main magnetic pole is excited by applying current to pass said first excitation coil and said second excitation coil, and a magnetomotive force of said first excitation coil and a magneto-motive force of said second excitation coil are asymmetric.

2. A magnetic head comprising:
a main magnetic pole;
a first auxiliary magnetic pole;
a second auxiliary magnetic pole having an area opposed to a floating surface that is larger than that of said first auxiliary magnetic pole;
a first excitation coil and a second excitation coil formed at both sides of said main magnetic pole;
said first excitation coil is formed between said main magnetic pole and said first auxiliary magnetic pole,
said second excitation coil is formed between said main magnetic pole and said second auxiliary magnetic pole;
a number of turns of said first excitation coil is larger than that of said second excitation coil;
said main magnetic pole is excited by applying current to pass said first excitation coil and said second excitation coil; and
a magneto-motive force of said first excitation coil is larger than that of said second excitation coil.

3. A magnetic head according to claim 2, wherein a magneto-motive force of said first excitation coil is smaller than four times that of said second excitation coil.

4. A magnetic head according to claim 2, wherein a ratio of a number of turns of coil between said first and second excitation coils is more than or equal to 1.5.

5. A magnetic head according to claim 2, wherein a ratio of number of turns of said first and second excitation coils is less than or equal to 2.5.

6. A magnetic head according to claim 2, wherein a magneto-motive force of said first excitation coil and second excitation coil are asymmetric.

7. A magnetic head according to claim 2, wherein current values applied to said first excitation coil and said second excitation coil are approximately constant.

* * * * *